United States Patent [19]

Holtgraver

[11] Patent Number: 4,570,901
[45] Date of Patent: Feb. 18, 1986

[54] POSITIONING ASSEMBLY FOR USE WITH ROTATABLE VALVES

[75] Inventor: Edward G. Holtgraver, Spring, Tex.

[73] Assignee: Keystone International, Inc., Houston, Tex.

[21] Appl. No.: 687,293

[22] Filed: Dec. 28, 1984

[51] Int. Cl.⁴ .................. F16K 31/60; F16K 35/00
[52] U.S. Cl. ........................ 251/98; 16/DIG. 12; 16/111 R; 74/543; 74/527; 251/297; 251/305; 403/93
[58] Field of Search ............ 251/95, 98, 99, 107, 251/108, 109, 114, 115, 116, 242, 297, 305, 308; 16/110 R, 111 R, 116 R, DIG. 12, DIG. 18; 74/543, 527, 546; 403/93, 94, 96

[56] References Cited

U.S. PATENT DOCUMENTS

| 2,202,645 | 5/1940 | Brandt | 251/95 |
| 2,239,831 | 4/1941 | Sadvary | 251/109 |
| 2,335,312 | 11/1943 | Rotheim | 251/242 |
| 3,009,214 | 11/1961 | Thompson | 16/110 R |
| 3,311,128 | 3/1967 | Taylor | 251/98 |
| 3,329,394 | 7/1967 | Overbaugh | 251/99 |
| 3,679,170 | 7/1972 | Bernas et al. | 251/297 |
| 3,858,843 | 1/1975 | Hartmann | 251/99 |
| 3,921,955 | 11/1975 | Haddad, Jr. | 251/305 |

FOREIGN PATENT DOCUMENTS 0021885 7/1981 France ................... 251/98

Primary Examiner—George L. Walton
Attorney, Agent, or Firm—Browning, Bushman, Zamecki & Anderson

[57] ABSTRACT

A positioning assembly for a rotatable valve having a valve body, a rotatable valve element and a valve stem rotatable with the valve element, the assembly including a handle with an engagement portion for engaging the valve stem and a positioning or indexing member carried by the valve body, positioning of the valve element being accomplished by flexure of the handle and selective engagement or disengagement with the positioning or indexing member.

14 Claims, 14 Drawing Figures

POSITIONING ASSEMBLY FOR USE WITH ROTATABLE VALVES

BACKGROUND OF THE INVENTION

1. Field of the Invention

The present invention relates to valves having rotatable valve elements and, more specifically, to an assembly for rotating and positioning the valve element of a rotatable valve.

2. Description of the Prior Art

Rotatable valves such as butterfly or disk valves, ball valves, plug valves, etc. are commonly provided with a valve stem which is attached to the valve element and which protrudes out of the valve body whereby the valve element may be rotated or positioned, externally of the valve body, by turning the valve stem. The valve stem may be rotated either manually by the use of a handle attached to the valve stem or automatically using an actuator assembly attached to the valve stem. In either event, the valve stem is provided with wrench flats or some other engagement means by which a handle, actuator or the like can be removably attached to the valve stem to prevent relative rotation therebetween.

It is quite common, particularly in the case of valves which are used in lower pressure applications, to utilize a handle whereby the valve can be manually operated. In order that the valve element may be rotated to a desired open position, e.g. in a throttling position, it is common for a positioning or indexing plate to be attached to the body and which is operatively associated with a latching mechanism on the handle such that the position of the handle and hence the position of the valve element can be selectively, releasably locked in a desired position.

Prior art handles for use with butterfly valves, ball valves, etc. are expensive to manufacture, both in terms of amount of material required and in machining operations, generally require expensive and time consuming casting or forging operations and are bulky. For example, a typical prior art valve handle is made from a casting and includes a broached sleeve which has wrench surfaces to engage the wrench flats of the valve stem. Additionally, the handle is provided with a pivotable, spring biased detent as a latch which is used to engage a notched plate (positioning plate) secured to the body of the valve, generally to the flange on the neck, such that the valve element can be moved to a desired position and maintained in that position by engagement between the detent and one of the selected notches on the plate.

SUMMARY OF THE INVENTION

It is therefore an object of the present invention to provide an improved positioning assembly for use with a valve having a rotatable valve element.

Another object of the present invention is to provide an inexpensive positioning assembly including a valve handle which can be used with rotatable valves such as butterfly valves, ball valves, plug valves and the like.

Yet a further object of the present invention is to provide a valve element positioning assembly for attachment to the stem and body of a rotatable valve which can be easily and inexpensively constructed without the need for casting, forging or expensive machining operations.

The above and other objects of the present invention will become apparent from the drawings, the description given herein and the appended claims.

In accordance with the above objects, the present invention provides an assembly for use with a rotatable valve having a valve body, a valve element disposed in the valve body for controlling flow therethrough, and a valve stem attached to the valve element and rotatable therewith. The assembly includes a positioning means which is carried by the valve body and a handle means which is attached to the valve stem. The handle means includes a stem engagement portion including a suitable means cooperative with the valve stem to prevent substantial relative rotational movement between the engagement portion and the valve stem, and a handle portion which is attached to the stem engagement portion and which extends generally transverse to the valve stem. The handle portion is resiliently flexible or deformable, i.e. it can flex, along its length in a plane passing generally axially through the valve stem. The handle means further includes a latch means which is carried by the handle portion and which is selectively engageable and disengageable with the positioning means in response to flexure of the handle portion.

BRIEF DESCRIPTION OF THE DRAWINGS

The invention may be more fully understood by reference to the following description of the drawings, wherein.

DETAILED DESCRIPTION OF THE PREFERRED EMBODIMENT

While the positioning assembly of the present invention will be described with particular reference to its use with a butterfly valve, it is to be understood that the invention is not so limited. Accordingly, the positioning assembly can be used with any valve having a rotatable valve element such as a ball valve, a plug valve, a globe valve, etc.

Figure 1:
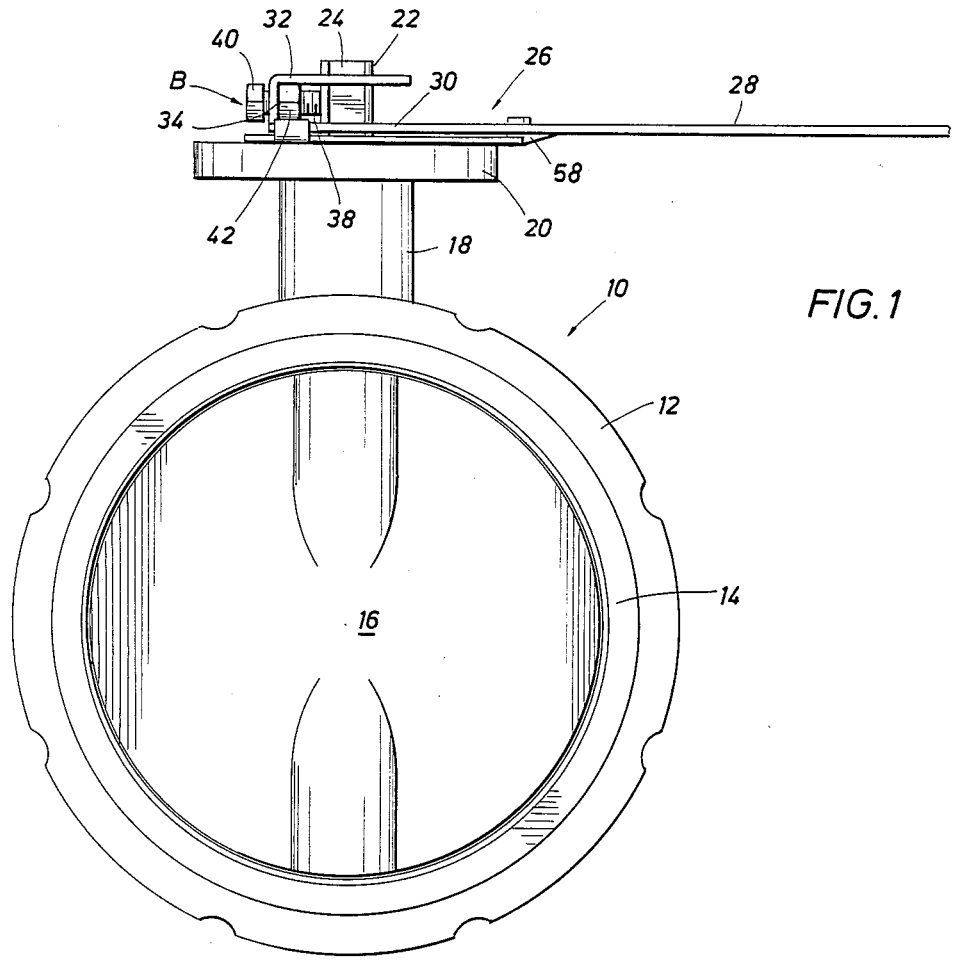
FIG. 1 is an elevational view of a butterfly valve having the positioning assembly of the present invention.
Figure 2:
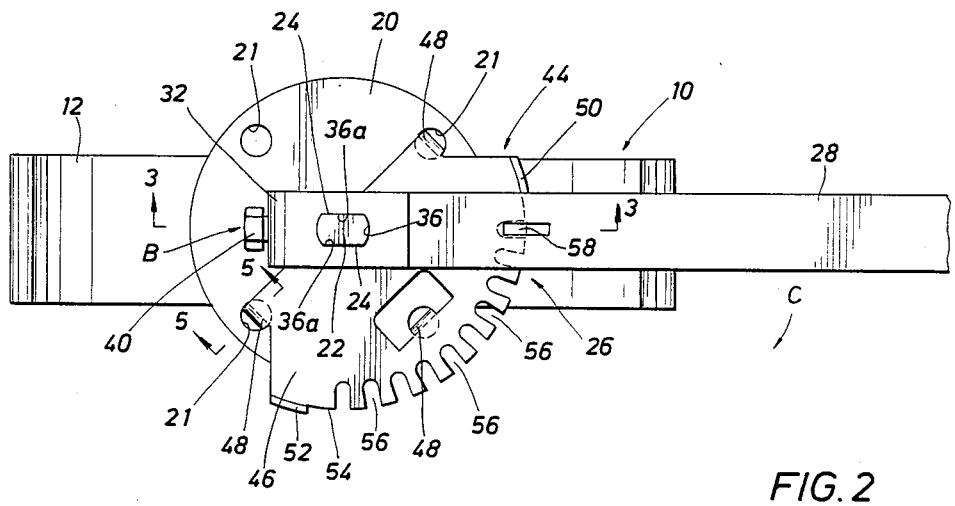
FIG. 2 is a top view of the valve and positioning assembly shown in FIG. 1.

Referring first to FIG. 1, there is shown a butterfly valve 10 having an annular body 12. Concentrically disposed in body 12 is a valve seat 14. Rotatably mounted in valve body 12 is a valve element, in this case a disk, 16. Disk 16 is pivotally mounted, in a well known fashion, in body 12 so as to be selectively, sealingly engageable and disengageable with the seat 14 to thereby open and close flow through valve 10. Valve 10 also has a neck 18 projecting outwardly from annular body 12. A flange 20 is formed on and projects radially outwardly from neck 18. As best seen with reference to FIG. 2, flange 20 is provided with a plurality of generally circumferentially spaced holes 21, holes 21 serving as a means to secure an actuator or, as described more fully hereafter, the positioning plate of the present invention.

Figure 3:
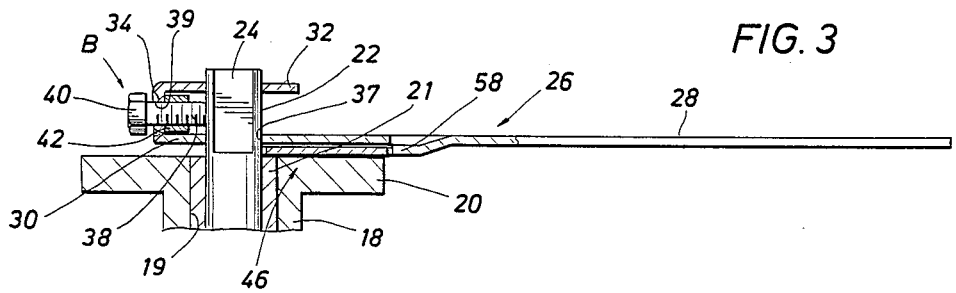
FIG. 3 is a cross-sectional view taken along the lines 3—3 of FIG. 2.

Neck 18 has a bore 19 through which a valve stem 22 extends, sealing between rack 18 and valve stem 22 being accomplished with packing gland 21 (See FIG. 3). Valve stem 22, which is provided with wrench flats 24, is secured to disk 16 in the well known manner whereby rotation of valve stem 22 results in rotation of disk 16.

Removably attached to valve stem 22 is a handle assembly shown generally as 26. Handle assembly 26 includes an elongate handle or gripping portion 28 which extends transverse, generally normal, to the axis of valve stem 22. Handle portion 28 is made of a material, usually metal, which is relatively thin and/or is resiliently flexible along its length, i.e. in a plane passing through the axis of stem 22, whereby handle portion 28 may be flexed. Handle assembly 26 further includes a first flange portion 30 which, as shown, is an extension of handle portion 28 and a second flange portion 32, first and second flange portions 32 being spaced and interconnected by a web 34. The handle assembly 26 can be easily and quickly formed by bending a straight, relatively flat, relatively thin piece of bar stock into the configuration shown. Alternately, second flange 32 and web 34 can be formed by bending a straight, generally flat, relatively thin piece of bar stock into an L-shape and then welding the free end of the short leg of the L to first flange portion 30. Second flange portion 32 has an opening 36 for receiving valve stem 22, while first flange portion 30 has a registering opening 37 for receiving valve stem 22. As best seen with reference to FIG. 2, opening 36 has a shape complementary to the cross-sectional shape of valve stem 22, i.e. having wrench surfaces 36a which engage wrench flats 24 on valve stem 22. Although not shown, the opening 37 in first flange portion 30 is similarly shaped. It will thus be seen that flange portion 30, web 34, flange 32 and the shaped openings 36, 37 formed in flange portions 30 and 32, respectively, form an engagement portion of handle assembly 26 which allows stem 22, and hence disk 16, to be rotated in response to rotation of handle assembly 26 via handle portion 28.

To prevent relative axial displacement of handle assembly 26 relative to valve stem 22, web 34 is provided with a bore 39 through which extends the threaded stud portion 38 of a bolt B having a head portion 40. Threaded stud portion 38 is received in a complementary threaded nut 42 whereby web 34 is disposed between the head 40 of the bolt B and nut 42. Nut 42 is sized such that opposed wrench flats thereon engage flange 30 and 32, respectively, to thereby prevent rotation of nut 42 as the stud portion 38 of the bolt is rotated. Accordingly, as the head 40 of the bolt B is rotated so as to advance it into engagement with valve stem 22, nut 42 will be forced against web 34 and valve stem 32 will be generally rigidly affixed to the flange portions 30 and 32 of handle assembly 26.

Figure 5:
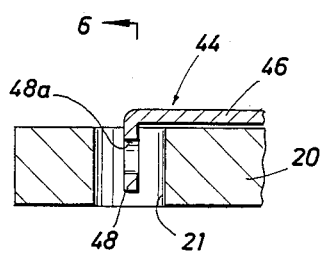
FIG. 5 is a view taken along the lines 5—5 of FIG. 2.
Figure 6:
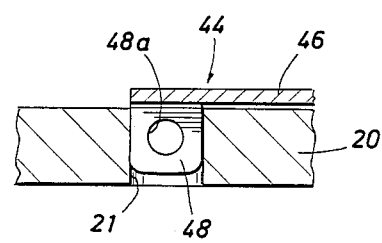
FIG. 6 is a view taken along the lines 6—6 of FIG. 5.

Removably attached to the flange 20 of valve 10 is a positioning or indexing plate shown generally as 44. Plate 44 has a generally planar portion 46. Projecting outwardly and generally transverse to planar portion 46 of plate 44 are a plurality of tangs 48. Tangs 48 are spaced on plate 44 so as to generally be in register with three of the holes 21 in the flange 20 of valve 10. As best seen with reference to FIGS. 5 and 6, tangs 48 are sized so as to frictionally engage the walls of the holes 21 much in the manner of a press fit. In assembly, plate 44 is positioned over flange 20 such that tangs 48 are in register with holes 21. Tangs 20 are then driven into holes 21, the frictional engagement between the walls of holes 21 and tangs 48 securing plate 44 to flange 20. Alternately, plate 44 can be secured to flange 20 by bolting. For this purpose, tangs 48 are provided with holes 48a, tangs 48 being essentially coplanar with planar section 46 or plate 44. Accordingly, by bringing holes 48a into register with holes 21 in flange 20, plate 44 can be readily detachably secured to flange 20.

Also projecting transversely from the planar portion 46 of plate 44 in generally the opposite direction from tangs 48 are first and second stop tabs 50 and 52, respectively. As will be apparent, stop tabs 50 and 52 serve to limit rotational movement of handle 28 and hence valve stem 22 to 90°, i.e. from a fully opened to a fully closed position of disk 16.

The planar portion 46 of plate 44 defines a generally arcuate, e.g. circular, perimeter 54. Spaced along the perimeter 54 are a series of notches 56. While notches 56 are shown as being generally equally spaced, it will be apparent that any arrangement of notches 56 can be employed.

Projecting from the handle portion 28 of handle assembly 26 is a detent 58, detent 58 projecting away from handle 58 in the opposite direction of web 34. Detent 58 is sized so as to be received in notches 56 as shown.

Figure 4:
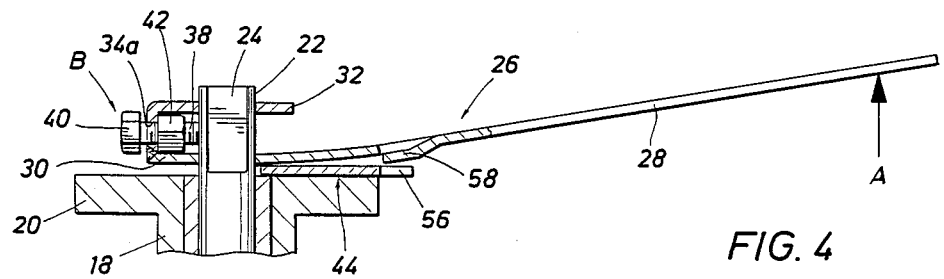
FIG. 4 is a view similar to FIG. 3 showing the handle portion of the positioning assembly in a disengaged mode.

Reference is now made to FIGS. 3 and 4 to show the operation of the handle assembly 26 in cooperation with positioning plate 44. In FIG. 3 is shown the condition of the handle assembly 26 depicted in FIG. 2, i.e. with detent 58 received in one of the notches 56 of plate 44. In this position, it will be recognized that handle 28 and hence valve stem 22 and disk 16 are not permitted any substantial rotation about the axis defined by valve stem 22. In order to reposition disk 16, i.e. change the opening through valve 10, handle portion 28 is moved in the direction of arrow A, i.e. generally away from plate 44 such that detent 58 is disengaged from plate 44. In this position, handle 28 and hence valve stem 22 and disk 16 may now be rotated in the direction shown by arrow B (FIG. 2) to reposition disk 16 to a desired open position up to and including the fully opened position when handle 28 abuts stop tab 52. Since handle portion 28 can be flexed along its length in a plane passing generally through valve stem 22, once the force urging handle 28 in the direction of arrow A is released, handle 28 will return to a position similar to that shown in FIG. 3 whereby detent 58 will be received in a pre-selected notch 56 in plate 44.

It will be seen that the handle assembly 26 as well as the positioning plate 44 shown in FIGS. 1-6 can be easily constructed from readily available and inexpensive material. Thus, handle assembly 26, for the most part, can be formed from relatively thin, flat metal bar stock by such simple techniques as bending, stamping, drilling and welding, whereas positioning plate 44 can be likewise formed.

Figure 7:
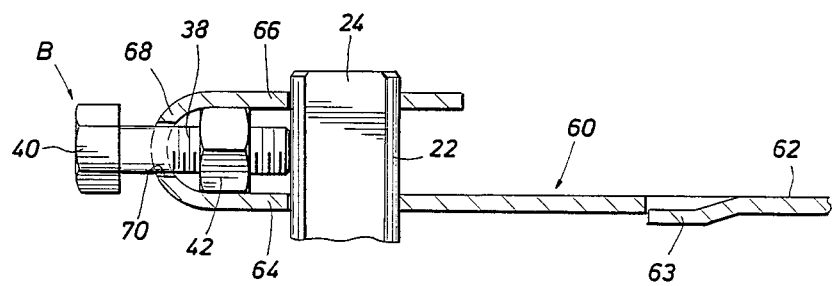
FIG. 7 is an elevational view, partly in section, of another embodiment of the handle and stem engagement portion of the positioning assembly of the present invention.

Referring now to FIG. 7, there is shown a slightly modified embodiment of the handle assembly of the present invention. The handle assembly shown generally at 60 in FIG. 7 includes a handle portion 62 having a detent 63, a first flange portion 64 which is an extension of handle 62, and a second flange portion 66 interconnected to front flange portion 64 by an integrally formed arcuate web portion 68. Web 68 is provided with a bore 70 for receiving the bolt B and securing the handle assembly 60 to valve stem 22 in the manner described above with respect to the embodiment shown in FIGS. 1-4. It can be seen that whereas in some embodiments a welding step(s) is required, in the embodiment of the handle assemblies shown in FIGS. 1-4 and 7, the handle assembly including the spaced, generally parallel flange members 64 and 66 can be formed from a single piece of relatively thin, flat bar stock by bending the bar stock into the desired shape. In any event, all the embodiments eliminate expensive machining operations such as broaching or the necessity for casting or for that matter expensive spring-loaded latches such as used in prior art handles.

Figure 8:
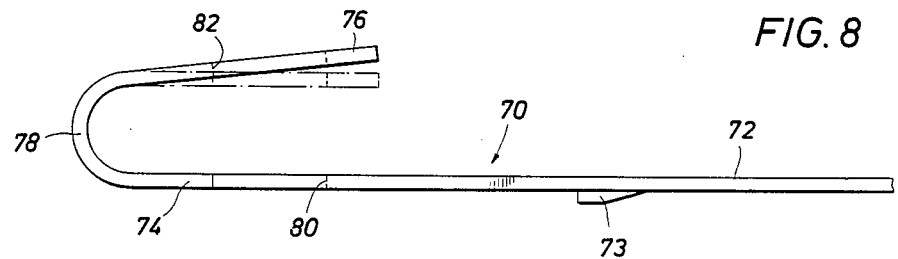
FIG. 8 is an elevational view of another embodiment of the handle assembly of the positioning assembly of the present invention.

Reference is now made to FIG. 8 for yet another embodiment of the handle assembly of the present invention. The handle assembly 70 shown in FIG. 8 includes an elongate handle portion 72, a first parallel flange member 74 formed by an extension of the handle portion 72, a second flange member 76 spaced from first flange member 74 and an arcuate web 78 adjoining flange members 74 and 76. Flange member 74 has an opening 80 for receiving a valve stem, while flange member 76 likewise has an opening 82 for receiving the valve stem, both of said openings having shapes for wrench-like engagement of the valve stem. In the relaxed position, i.e. when handle assembly 70 is not connected to the valve stem, openings 80 and 82 are generally non-coaxial since flange 76 is skewed with respect to flange 74. It will be appreciated that in the relaxed position, handle assembly 70 cannot be affixed to the valve stem such that the valve stem extends through openings 80 and 82 since, as noted above, the openings are non-coaxial, i.e. they are not completely in register. However, the engagement portion of handle assembly 70 comprising flange 74, web 78 and flange 76 is made of a material, generally metallic, having sufficient resiliency whereby flange member 76 can be resiliently deformed to the position shown in phantom whereby openings 80 and 82 will be substantially coaxial and the valve stem can therefore be received through both openings 80 and 82. However, because of the resilient nature of flange 76, once the force holding flange 76 in the phantom position is released, the walls defining both openings 80 and 82 will be biased or urged into frictional engagement with the valve stem such that the stem will be tightly gripped by the handle assembly 70.

Like the previous embodiments discussed, handle assembly 70 is provided with a latch or detent 73 for engagement of a positioning or indexing plate, e.g. plate 44, such positioning being accomplished by virtue of the flexible nature of the handle portion 72 along its length.

Figure 9:
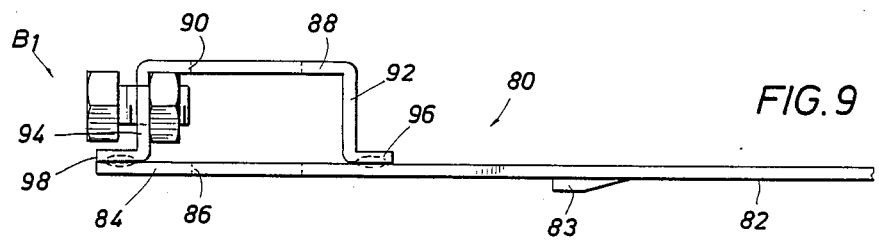
FIG. 9 is a view, similar to FIG. 8, showing yet another embodiment of the handle assembly of the positioning assembly of the present invention.

Turning now to FIG. 9, there is shown still another embodiment of the present invention wherein the handle assembly 80 includes a handle portion 82 having a latch or detent 83 similar to detent 58 described with respect to the embodiments of FIGS. 1-4. Handle assembly 80 also includes a first flange portion 84 formed by an extension of handle portion 82, flange portion 84 having an opening 86 for receipt of the valve stem therethrough. Second flange portion 88, spaced and generally parallel to flange portion 84, has an opening 90, coaxial and in register with opening 86 whereby the valve stem can be received by handle assembly 80. Openings 86 and 88 have shapes so as to engage a valve stem in a wrench-like manner as described above. Flanges 84 and 88 are spaced apart by first and second webs 92 and 94, respectively, which are integrally formed with second flange portion 88. Webs 92 and 94 are secured to flange portion 84 by means of lips 96 and 98 which protrude outwardly from webs 92 and 94, respectively, and which are welded to flange portion 84. Attachment of handle assembly 80 to the valve stem in a method to prevent relative axial movement therebetwen is accomplished by means of a bolt $B_1$ in the same manner as described above with respect to the embodiments of FIGS. 1-4. Once again, it can be seen that the handle assembly can be easily and inexpensively formed from thin bar stock using simple techniques of bending, stamping, welding and drilling.

Figure 10:
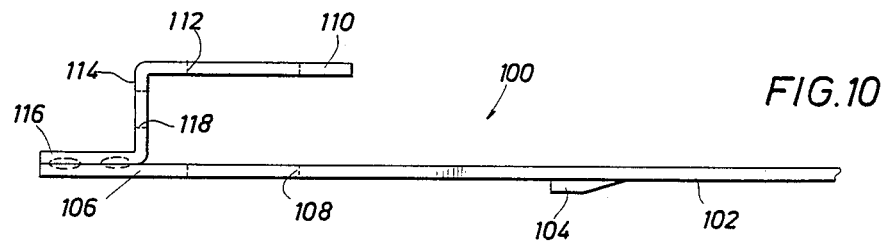
FIG. 10 is a view, similar to FIG. 8, of yet another embodiment of the handle assembly of the positioning assembly of the present invention.

Turning now to FIG. 10, there is shown yet another embodiment of a handle assembly of the present invention, the assembly 100 including a handle portion 102 having a latch or detent 104 and a first flange portion 106 having an opening 108 to receive the valve stem in a wrench-engaging manner. Handle assembly 100 also has a second flange portion 110 spaced from flange portion 106 and generally parallel thereto and having an opening 112 for receiving the valve stem in a wrench-gripping arrangement. Flange portion 110 is spaced from flange portion 106 by a web portion 114 integrally formed with flange portion 110. Web portion 114 is secured to flange portion 106 by means of a lip 116 extending outwardly from web 14 in the opposite direction from flange 110, lip 116 being welded to flange portion 106. It can be seen that flange portion 110, web 114 and lip 116 are easily formed from a single piece of flat, relatively thin bar stock simply by bending into a generally S-shaped configuration as shown. Web 114 has a bore 118 which is tapped so as to threadedly receive a bolt such as bolt $B_1$ or B to thereby provide for the attachment of handle asesmbly 100 to the valve stem without the need of a nut such as shown in some of the previously discussed embodiments.

Figure 11:
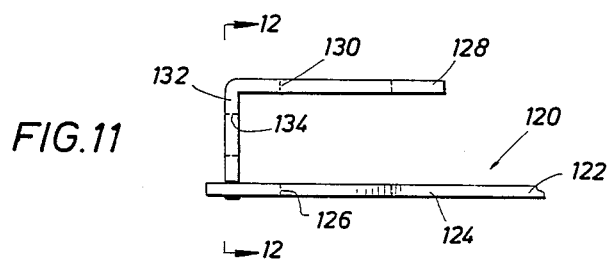
FIG. 11 is a view, similar to FIG. 8, showing yet another embodiment of the handle assembly of the positioning assembly of the present invention.
Figure 12:
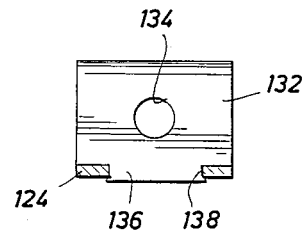
FIG. 12 is a view taken along the lines 12—12 of FIG. 11.

Turning now to FIGS. 11 and 12, there is shown an embodiment of the present invention in which the handle assembly 120 comprises a handle portion 122 and a first flange portion 124, formed by an extension of the handle portion 122 and having a valve stem receiving opening 126 for engaging the valve stem in wrench-like fashion. The assembly 120 further includes a second spaced flange portion 128, generally parallel with flange portion 124, and having an opening 130 for receiving the valve stem in wrench-engaging manner. Flange portion 128 is spaced from flange portion 124 by means of a web 132 having a tapped bore 134 similar to that shown in FIG. 10. As can be seen, flange 128 and web 132 are formed from a single piece of relatively thin, flat bar stock bent into an L-shaped configuration. Web 132 is secured to flange 124 by means of a dovetail joint comprised of a dovetail-shaped tenon 136 projecting from the free end of web 132 and received in a complementary shaped mortise 138 formed in first flange portion 124.

Figure 13:
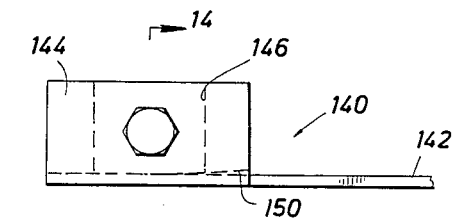
FIG. 13 is an elevational view, similar to FIG. 8, of another embodiment of the handle assembly of the positioning assembly of the present invention.
Figure 14:
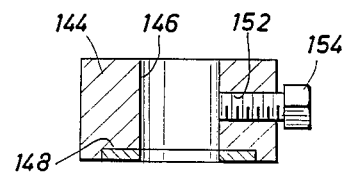
FIG. 14 is a view taken along the lines 14—14 of FIG. 13.

Referring to FIGS. 13 and 14, there is shown another embodiment of the handle assembly of the present invention, the handle assembly 140 including a handle portion 142 affixed to a stem engagement block 144 having an opening 146 for receiving a valve stem in wrench-engaging fashion. Handle portion 142 is received in a recess 148 of engagement block 144, recess 148 being deeper adjacent the end closest to handle portion 142 whereby handle 142 may be flexed as described above to selectively engage and disengage the positioning plate. To prevent relative axial movement between the valve stem and handle assembly 140, engagement block 144 is provided with a tapped bore 152 which is generally transverse to opening 146 and in which is received a complementary threaded bolt 154 for engaging the valve stem and tightly securing handle assembly 40 to the valve stem.

As can be seen, the positioning assembly of the present invention utilizes a unique handle assembly which can resiliently flex or deform along its length to thereby permit selective engagement and/or disengagement of the positioning or indexing plate. The handle assembly of the present invention can be made without the necessity for casting or forging of parts and is conveniently constructed, save for the embodiment shown in FIGS. 13 and 14, by forming, as by bending, relatively thin, flat bar stock to the desired configurations followed, in some cases, by welding. No broaching is necessary in the handle assemblies of the present invention and only relatively simple machining techniques such as drilling, tapping or milling are required. While in some cases the assembly may be made by welding, in other cases it can be conveniently constructed without the necessity even of welding (See FIGS. 11 and 12).

While in the embodiment shown, the valve stem is gripped in wrench-like fashion by the engagement portion of the handle assembly, it will be appreciated that other means of preventing relative rotational movement between the stem and the handle assembly can be used. For example, the handle assembly could be keyed to the valve stem.

In the description above, the positioning means has been described with reference to a plate removably attached to the valve body. It will be appreciated by those skilled in the art that the positioning means could be formed by notching the flange 20 attached to the neck of the valve, i.e. the positioning means could be integrally formed with the valve body in such a fashion. Thus, as described above, the positioning means may be carried by the valve body in the sense that it takes the form of a separate plate which is preferably removably attached to the valve body or it is carried by the valve body in the sense that the positioning means is actually formed on the flange of the valve body and is integrally formed therewith.

The foregoing represents only one preferred embodiment of the invention, and it will be understood that numerous modifications may suggest themselves to those skilled in the art. Accordingly, it is intended that the scope of the present invention be limited only by the claims which follow.

What is claimed is:

1. An assembly for use with a rotatable valve having a body, a rotatable valve element and a stem interconnected to said rotatable valve element comprising:
   positioning means carried by said valve body; and
   handle means, said handle means including
      a stem engagement portion attached to said stem, said engagement portion having means for preventing substantive relative rotational movement between said engagement portion and said stem;
      a handle portion attached to said stem engagement portion and extending generally transverse to said stem, said handle portion being resiliently flexible along its length in a plane passing generally axially through said stem; and
      latch means carried by said handle portion, said latch means being selectively engageable and disengageable with said positioning means solely in response to movement of said handle portion due to the flexure of said handle portion.

2. The assembly of claim 1 wherein said valve stem includes wrench surfaces forming wrench flats and said stem engagement portion includes an opening for receiving said stem, said opening having wrench surfaces engageable with said wrench flats.

3. The assembly of claim 1 wherein said stem engagement portion further includes means for restraining relative axial movement of said handle means and said stem.

4. The assembly of claim 1 wherein said stem engagement portion includes first and second spaced flange members adjoined by a web portion, each of said flange members having an opening for receiving said stem.

5. The assembly of claim 4 wherein said flange members are generally parallel and said openings in said first and second members are in register with one another.

6. The assembly of claim 4 wherein said first flange member comprises an extension of said handle portion.

7. The assembly of claim 4 wherein said web portion has a bore therethrough generally transverse to the axis of said openings in said first and second flange members.

8. The assembly of claim 7 wherein said bore is threaded for receipt of a complementary threaded bolt whereby said stem engagement portion can be secured to said stem to prevent relative rotational movement between said engagement portion and said stem.

9. The assembly of claim 7 wherein said means for preventing relative rotational movement includes a nut and bolt assembly, said bolt being received in said bore, said nut being disposed between said first and second flange members, said nut being fixed against rotation relative to said bolt, said web portion being disposed between the head of said bolt and said nut.

10. The assembly of claim 4 wherein said engagement portion is generally U-shaped having a first leg defining said first flange member and comprising an extension of said handle portion, and a second leg defining said second flange member, said first and second legs being adjoined by a generally arcuate web portion, said second leg portion being resiliently movable from a first position wherein said first and second openings are generally non-coaxial to a second position wherein said first and second openings are generally coaxial.

11. The assembly of claim 1 wherein said positioning means comprises a plate member removably attached to said valve body and having a generally laterally outwardly extending portion with respect to said valve stem, said laterally outwardly extending portion defining a generally arcuate perimeter, said plate member further including a plurality of spaced notches on said perimeter, said notches being alternately, selectively engageable with said latch means.

12. The assembly of claim 11 wherein said latch means comprises a detent projecting from said handle portion, said detent being alternately, selectively received in said notches.

13. The assembly of claim 11 wherein said valve body includes a flange portion having at least one hole therein and said positioning means includes a tang projecting from said plate, said tang being frictionally received in said bore.

14. The assembly of claim 13 wherein there are a plurality of said holes in said flange of said valve body and a plurality of said tangs, one of said tangs being received in a respective one of said holes.

* * * * *